(12) United States Patent
Robertson et al.

(10) Patent No.: US 9,815,527 B2
(45) Date of Patent: Nov. 14, 2017

(54) MARINE LIFT FOR MULTI-HULL VESSELS (71) Applicant: Robertson & Caine (Pty), Ltd., Woodstock (ZA)

(72) Inventors: John Robertson, Indian Rocks Beach, FL (US); Alexander Simonis, Cape Town (ZA)

(73) Assignee: Robertson & Caine (PTY), Ltd., Woodstock (ZA)

( * ) Notice: Subject to any disclaimer, the term of this patent is extended or adjusted under 35 U.S.C. 154(b) by 87 days.

(21) Appl. No.: 14/521,068

(22) Filed: Oct. 22, 2014

(65) Prior Publication Data
US 2015/0044000 A1 Feb. 12, 2015

Related U.S. Application Data (63) Continuation-in-part of application No. 13/607,965, filed on Sep. 10, 2012, now Pat. No. 8,811,749.

(60) Provisional application No. 61/663,289, filed on Jun. 22, 2012.

(51) Int. Cl.
| B63B 35/40 | (2006.01) |
|---|---|
| B63B 23/40 | (2006.01) |
| B63B 23/64 | (2006.01) |
| B63B 27/14 | (2006.01) |
| B63B 27/16 | (2006.01) |
| B63B 1/10 | (2006.01) |
| B63B 27/36 | (2006.01) |
| B60P 1/44 | (2006.01) |
| B63B 29/02 | (2006.01) |

(52) U.S. Cl.
CPC .............. B63B 23/40 (2013.01); B63B 1/10 (2013.01); B63B 23/64 (2013.01); B63B 27/146 (2013.01); B63B 27/16 (2013.01); B63B 27/36 (2013.01); B60P 1/4414 (2013.01); B63B 2029/022 (2013.01)

(58) Field of Classification Search
CPC ... B63B 27/36; B63B 2027/165; B63B 23/40; B63B 27/16; B60P 1/4414; B60P 1/4421; B60P 1/44; B60P 3/10; B60P 1/02; B60P 3/07
USPC ......................... 414/557, 540, 545, 589, 678
See application file for complete search history.

(56) References Cited

U.S. PATENT DOCUMENTS

| 1,113,191 | A | * | 10/1914 | Breese | .................. B60P 1/4414 414/557 |
|---|---|---|---|---|---|
| 1,620,256 | A | * | 3/1927 | Heise | .................... B60P 1/4421 414/545 |
| 2,456,805 | A | * | 12/1948 | Wohlforth | ............. B60P 1/4414 414/545 |
| 2,676,720 | A | * | 4/1954 | Noble | ................... B60P 1/4414 254/10 C |
| 6,782,842 | B1 | * | 8/2004 | Alvord | .................... B63B 23/32 114/259 |

(Continued)

Primary Examiner — Andrew Polay
(74) Attorney, Agent, or Firm — Allen Dyer Doppelt & Gilchrist (57) ABSTRACT

Marine lift apparatus for raising and lowering vessels, platforms, and cargo are disclosed. A lift apparatus comprises a multi-component structure capable of movement, at least one flexible member, and at least one piston device. In some aspects, marine lift apparatus facilitates the level raising, lowering, and storing of vessels, platforms, and cargo. Lift apparatus mountable onto multi-hull vessels, such as catamarans, configured for lifting a combination swim and dinghy platform are also disclosed.

17 Claims, 9 Drawing Sheets

(56) References Cited

U.S. PATENT DOCUMENTS

| | | | | |
|---|---|---|---|---|
| 7,179,040 B2* | 2/2007 | Masuda | ............... | B60R 5/04 |
| | | | | 187/211 |
| 7,946,243 B1* | 5/2011 | Ulrich | ............... | B63B 27/16 |
| | | | | 114/362 |
| 2002/0136625 A1* | 9/2002 | Namgung | ............ | B60P 1/4414 |
| | | | | 414/563 |
| 2006/0051191 A1* | 3/2006 | Dupuy | ............... | B60P 1/4457 |
| | | | | 414/522 |
| 2012/0160143 A1* | 6/2012 | Bailey | ............... | B63B 21/66 |
| | | | | 114/61.1 |

* cited by examiner

MARINE LIFT FOR MULTI-HULL VESSELS

CROSS-REFERENCE TO RELATED APPLICATIONS

This application claims the benefit, and is a continuation-in-part of Applicant's co-pending U.S. patent application Ser. No. 13/607,956 entitled "Marine Lift with Pantograph Movement", filed Sep. 10, 2012, which claims the benefit of U.S. Provisional Patent Application No. 61/663,289 entitled "Marine Lift with Pantograph Movement", filed Jun. 22, 2012; each of which is incorporated by reference herein in its entirety. This application claims the benefit of, and is a continuation-in-part of Applicant's co-pending International Application No. PCT/US12/54423, entitled "Marine Lift With Pantograph Movement", with an international filing date of Sep. 10, 2012, which is incorporated by reference herein in its entirety.

FIELD OF THE DISCLOSURE

The present disclosure relates to marine lifts and more particularly to the launch and recovery of marine vessels.

BACKGROUND

Many presently-available marine lifts utilize large and complex lift mechanisms. The size and complexity of many marine lifts limits their use to larger watercraft because smaller vessels cannot support the weight of the lift mechanism. Lifts have been mounted on large luxury watercraft where the lift is configured to raise and lower smaller boats, dinghies, or personal watercraft. Marine lifts may also be mounted to a permanent or semi-permanent marine structure such as a dock, a floating platform, a semi-submersible platform, or a fixed platform. Marine lifts may be used to raise, lower, and transport marine vessels, cargo, and people.

In the case of vessel-mounted marine lifts, lift mechanisms are often mounted on the transom of mono-hulled vessels. This mounting location exposes the lift mechanism to the surrounding environment where waves, water, harsh sunlight, and artificial conditions such as floating debris or a collision may damage the lift mechanism. Outboard mounting of the lift mechanism also hinders diagnostic and repair efforts when a vessel is underway. In order to protect the lift mechanism from the surrounding environment, a cover or other shielding element must be installed which adds additional weight to the marine lift.

Transom-mounted lift mechanisms configured for mono-hulled vessels are difficult to adapt to multi-hull vessels (e.g., catamarans, trimarans, proas, and the like). Mono-hulled vessels provide a large, near-vertical surface for mounting the lift mechanism. In contrast, the decks which interconnect the hulls of a multi-hull vessel such as a catamaran provide only a narrow, elevated mounting surface for the lift mechanism. Transom-mounted lift mechanisms often cannot be adapted to mount to such a narrow, elevated mounting surface.

The length of the marine vessel being carried by a lift mechanism mounted on a multi-hull vessel is constrained by the dimensions of the multi-hull vessel. For example, where a lift mechanism is mounted between the twin hulls of a catamaran, the lift mechanism cannot raise or lower a dinghy longer than the distance between the hulls of the catamaran.

While many marine lifts are capable of raising and lowering significant loads, these lifts often tilt or flex out of level as the load is lowered or raised. Other marine lifts provide a level surface in only one position, such as the raised position. This tilting makes raising and lowering many loads such as smaller boats, dry cargo, and people an unstable and dangerous undertaking. Loads may slide off the marine lift as it ascends, descends, or is in a deployed position. Lack of a level surface also makes many marine lifts dangerous for a person to stand on. Furthermore, this tipping condition may cause a portion of a marine lift to drag in the water and may require an additional locking mechanism to maintain a marine lift platform's position when not in operation.

Given the foregoing, there is a need for simpler lift apparatus which may be adapted for use on multi-hull vessels, lift apparatus wherein the apparatus is at least partially protected from environmental hazards, lift apparatus capable of carrying larger vessels, and lift apparatus configured to provide a level surface as the lift is operated. Lift apparatus that may be raised and lowered via a force provided by a single device are also desired.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

This disclosure addresses the above-described needs by providing marine lift apparatus driven by a single piston system and methods for utilizing such marine lift apparatus. In various aspects, the attached platform or other carrying device is keep level during raising and lowering.

In one aspect, a lift apparatus for lifting a combination swim and dinghy platform is mounted on a multihull vessel. The lift apparatus comprises two assemblies and a platform. In some aspects, the platform stays level as it ascends and descends.

The platform is a flat surface, suitable for swimming and recreation comprising one or more channels and one or more chock assemblies which lay flush with the top surface of the platform when stowed. When deployed, the chock assemblies are configured to support a watercraft, such as a dinghy. In some aspects, chock assemblies are moveable fore and aft in order to accommodate larger watercraft on the lift apparatus and to redistribute the weight of the watercraft when the lift apparatus is being utilized.

In some aspects, the platform moves aft as it descends, facilitating easy docking with a watercraft, such as a dinghy. The lift apparatus may be mounted on a multi-hull vessel and configured to facilitate raising and lowering a dinghy with a length greater than the platform length and greater than the distance between the hulls of a multi-hull vessel, such as a catamaran.

In an aspect, the lift apparatus comprises a piston device integrated with a wire system to facilitate raising and lowering of the lift apparatus. The piston device may function to discharge or take in portions of one or more attached flexible members comprising the wire system, such as cables or similar members of high tensile strength, which are passed through a series of horizontally and vertically configured pulleys and connect the piston device to the lift apparatus at one more attachment points. Thus, the lift apparatus may be raised and lowered via the functioning of a singular mechanism; namely, the piston device.

Further features and advantages of the apparatus and methods disclosed herein, as well as the structure and operation of various aspects of the present disclosure, are described in detail below with reference to the accompanying figures.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to marine lift apparatus for raising, lowering, and storing vessels, platforms, and cargo, and particularly to such apparatus that are driven by a piston system.

Figure 1:
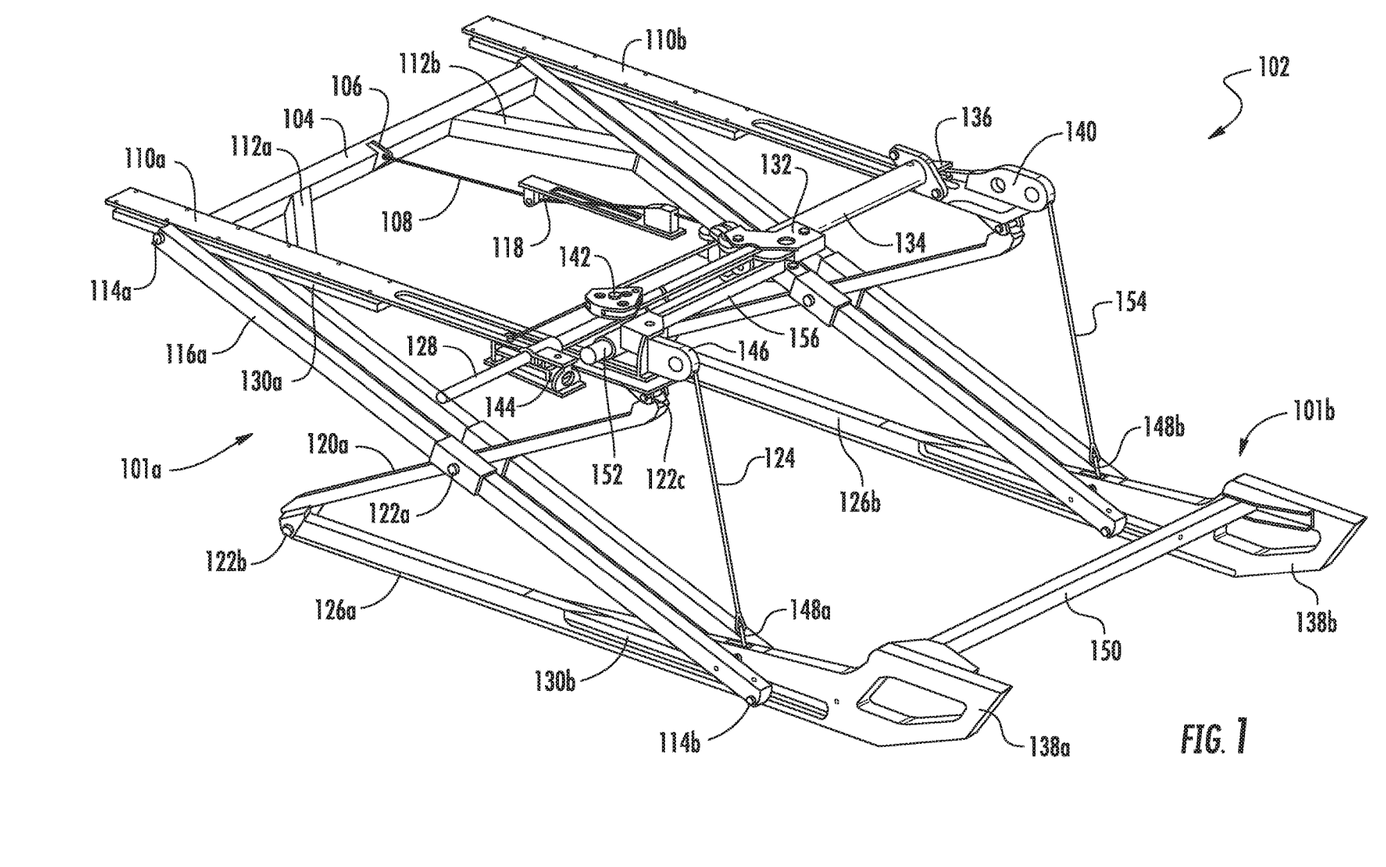
FIG. 1 is a top front perspective view of a piston-driven lift apparatus between a raised and a lowered position, in accordance with an aspect of the present disclosure.

Referring now to FIG. 1, a top front perspective view of a piston-driven lift apparatus 102 between a raised and a lowered position, in accordance with an aspect of the present disclosure, is shown.

Lift apparatus 102 broadly comprises at least one assembly 101 (shown as assemblies 101a-b in FIG. 1) comprising support brace 110 (shown as a pair of support braces 110a-b for two assemblies in FIG. 1), at least one slide arm 116 (labeled only as slide arm 116a in FIG. 1, for clarity), at least one link arm 120 (labeled only as link arm 120a in FIG. 1, for clarity), at least one lifting bar 126 (shown as a pair of lifting bars 126a-b for two assemblies in FIG. 1), and multiple slides 114 (labeled only as 114a-b in FIG. 1, for clarity).

Slide 114 may comprise bolts, screws, pins, knobs, spools, or any other similar components as will be appreciated by those skilled in the relevant art(s) after reading the description herein. Slides 114 may be securely attached at opposing distal ends of slide arm 116. Slides 114 may be configured to fit within corresponding lateral slots 130 (labeled only as 130 a-b in FIG. 1, for clarity). Lateral slots 130 may be configured as a portion of support brace 110 and lifting bar 126, or may be part of separate components securely affixed thereto. Lateral slots 130 may have a height substantially equal to the size of slides 114 such that minimal to no vertical movement of slides 114 is possible within lateral slots 130. Additionally, lateral slots 130 may be of a length sufficient to allow for the functioning of lift apparatus 102 when slides 114 slide a distance spanning the entirety of slot 130. Slides 114 may be configured to slidably connect slide arm 116 to support brace 110 at one end and to lifting bar 126 at the other end. The sliding of each slide 114 along the entire length of a given lateral slot 130 facilitates the movement of slide arm 116 and any components of lift apparatus 102 connected thereto.

Support brace 110, slide arm 116, lifting bar 126, and link arm 120 may be interconnected via various fasteners 122 (labeled only as 122a-c in FIG. 1, for clarity). Fasteners 122 may connect link arm 120 to support brace 110, slide arm 116, and lifting bar 126 securely in a way that allows for a pivoting movement at each connection point. Fasteners 122 may comprise bolts, screws, nuts, washers, pins, nails, or any other similar components and/or any combination thereof as will be recognized by those skilled in the relevant art(s). Link arm 120 may connect to the front portion of support brace 110 and the rear portion of lifting bar 126 at opposing distal ends, and to slide arm 116 at a location approximately where the middle of link arm 120 crosses the middle of slide arm 116. Such a configuration may function to control and limit the movement of lift apparatus 102 to desired ranges of motion; particularly, a slissoring style of movement. In some aspects, an assembly comprises two motion engages 116 configured to be connected on opposing sides of support brace 110, link arm 120, and lifting bar 126 via a singular slide 114 or fastener 122 in the same locations as described above. Each lifting bar 126 further includes lifting member which is positioned to connect to, for example, a platform, causing the platform to raise and lower via lift apparatus 102.

A second identical assembly 101b may be included to form a second side of lift apparatus 102 as depicted in FIG. 1. The two sides of lift apparatus 102 may be connected to each other and supported/stabilized via upper crossbar 104 and lower crossbar 150. Upper crossbar 104 may be securely connected at opposing distal ends to a pair of slide arms 116. Support beams 112 (shown as 112a-b in FIG. 1) may further serve to connect upper crossbar 104 to slide arms 116 to provide added support and stability thereto. Similarly, lower crossbar 150 may be connected at opposing distal ends to a pair of lifting bars 126a-b.

Lift apparatus 102 may be further configured with at least one piston device to facilitate the raising and lowering functions of apparatus 102. More specifically, the piston device may comprise a piston housed within piston barrel 156. A piston rod within piston barrel 156 may be securely attached to and/or formed as part of the piston and may interface with flexible member 108 at rod end port 152. Within piston barrel 156, the piston may be driven by forces induced by liquid and/or gaseous pressure differences as recognized by those skilled in the relevant art(s) as being capable of driving piston movement. Additionally, the functioning of the piston device may be complemented by tube 134 and cylinder 128. Cylinder 128 may comprise a lower portion diameter and an upper portion diameter, the lower portion diameter being substantially similar to the inner diameter of the hollow portion within tube 134, and the upper portion diameter being less than the lower portion diameter. The lower portion diameter may be configured to slide within tube 134 in an oscillating inward/outward fashion facilitated by the movement of the piston device. Specifically, the movement of the piston device effectuates movement of a flexible member 108 securely attached to an end of the piston rod, as discussed in detail below. Flexible member 108 passes through pulley system 142, thereby causing it to move. Pulley system 142, in turn, is mounted on the upper portion of cylinder 128, thereby causing cylinder 128 to move when pulley system 142 moves. Furthermore, the upper diameter portion of cylinder 128 may slidably pass through an opening of substantially similar diameter within cylinder bracket 144, which may be rigidly affixed to the structure that lift apparatus is mounted onto. Thus, cylinder bracket 144 may provide cylinder 128 with an added degree of support and stability. The functioning of the piston device may be initiated and/or controlled by a user, or initiated and/or controlled by one or more computing devices, either completely or partially.

In some alternative aspects, multiple piston devices are used with lift apparatus 102. As will be apparent to those skilled in the relevant art(s) after reading the description herein, other devices, assemblies, and/or combinations thereof may be used to move lift assembly 102 between raised and lowered positions.

The base of tube 134 may be attached to a structure capable of receiving lift apparatus 102 via tube bracket 136. The opposite end of tube 134, which interfaces with cylinder 128, may be attached to a central bracket 132, which attaches to the end of piston barrel 156 distal to rod end port 152, as well as the structure upon which lift apparatus 102 may be mounted. The rod end port 152 end of piston barrel 156 may pass through a piston bracket 146, which further attaches to the structure upon which lift apparatus 102 is mounted.

Cylinder bracket 144, piston bracket 146, central bracket 132, tube bracket 136, and alignment bracket 140 may all be rigidly attached to a structure upon which lift apparatus 102 may be mounted via fasteners comprising bolts, screws, nuts, washers, nails, pins, or any similar components and/or combinations thereof as will be recognized by those skilled in the relevant art(s).

Slide arm 116, link arm 120, lifting bar 126, and/or lower crossbar 150 may be constructed of any durable rigid material as recognized by those skilled in the relevant art(s), including but not limited to metals and rigid polymers. Additionally, they may be hollow and/or ported in order to allow them to fill with water when they are submersed, thereby providing for easier submersion, as well as be drained when they are lifted out of the water for easier raising. The other rigid components of lift apparatus 102, including support brace 110, upper crossbar 104, and support beams 112 may be constructed of similarly rigid metals and polymers, but may not necessarily be hollow and/or ported.

All of the components of lift apparatus 102 may be held together via bolts, screws, nails, pins, clips, nuts, washers, weld points, adhesives, or any other means of connectivity as will be appreciated by those skilled in the relevant art(s) after reading the description herein. Furthermore, the components of 102 may be made of rigid, durable, and corrosion-resistant materials including but not limited to metals, rigid polymers, and similar materials as will be appreciated by those skilled in the relevant art(s) after reading the description herein.

Lift apparatus 102 may be incorporated with three flexible members: 108, 124, and 154, which may comprise cables, wires, ropes, cords, or any similar structure of high tensile strength as will be appreciated by those skilled in the relevant art(s) after reading the description herein. Flexible member 108 may attach at one end to upper crossbar 104 at upper crossbar attachment point 106 positioned at approximately the midway point thereon. Upper crossbar attachment point 106 may be formed as part of upper crossbar 104 or may be securely affixed thereto, and may comprise a hook, loop, or similar structure as recognized by those skilled in the relevant art(s). Flexible member 108 may pass through guiding mechanism 118, portions of central bracket 132, pulley system 142, and cylinder bracket 144, and be securely attached to the piston rod within piston barrel 156 by entering rod end port 152. In a similar fashion, flexible members 124 and 154 may attach to lifting bars 126a-b at corresponding lifting bar attachment points 148a-b. Lifting bar attachment points 148 may comprise loops, hooks, or similar structures as recognized by those skilled in the relevant art(s), and may be formed as a portion of or may be securely affixed to lifting bars 126. Flexible member 154 may start at lifting bar attachment point 148b and then pass through portions of alignment bracket 140, tube bracket 136, central bracket 132, pulley system 142, and then be attached to pulley system 142. Similarly, flexible member 124 may start at lifting bar attachment point 148a, pass through piston bracket 146, central bracket 132, and pulley system 142, and then be attached to pulley system 142. The configurations of flexible members 108, 124, and 154 will be described more specifically in the discussion of FIG. 2 below.

Figure 2:
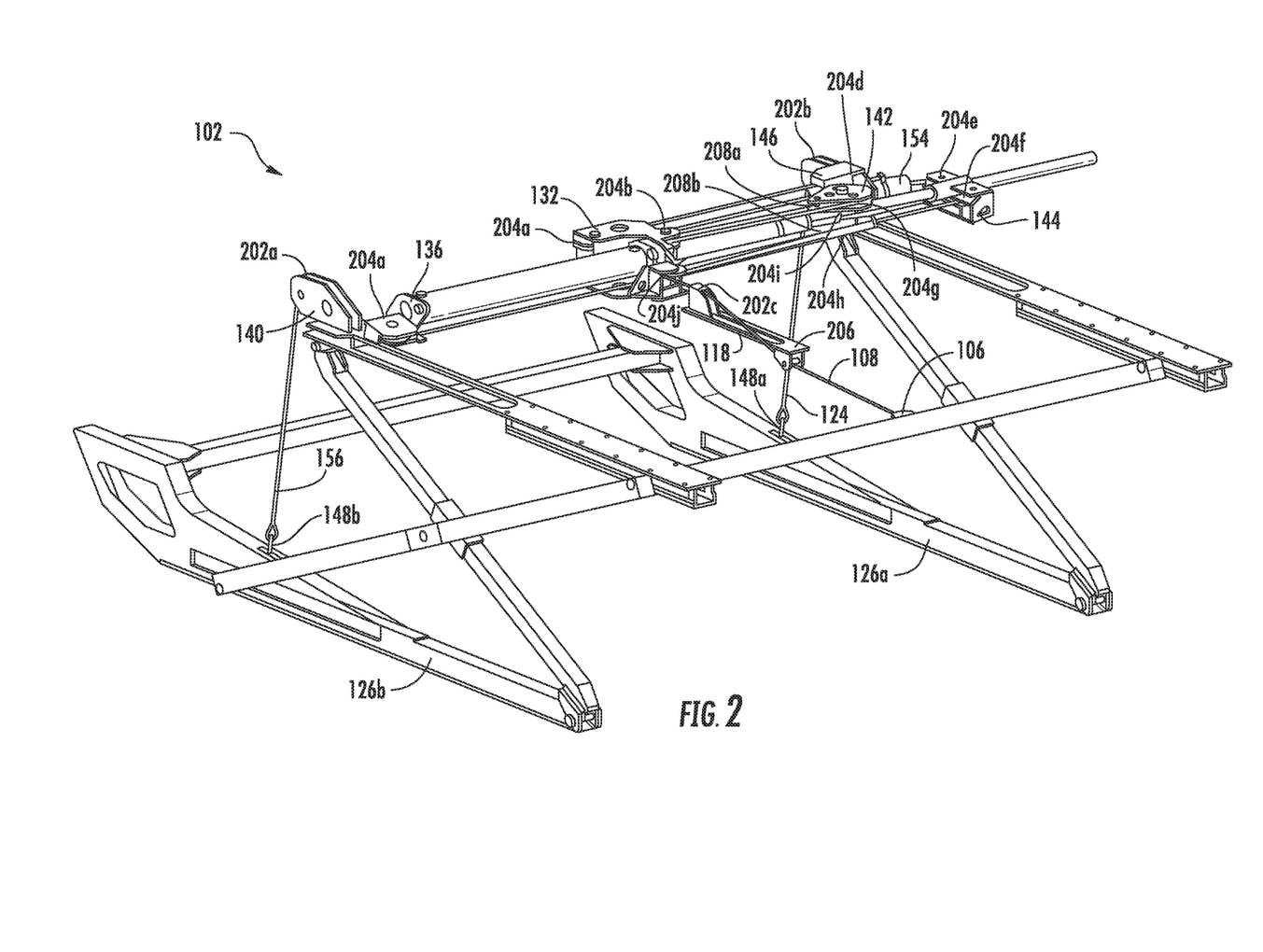
FIG. 2 is a top rear perspective view of a piston-driven lift apparatus between a raised and a lowered position, in accordance with an aspect of the present disclosure

Referring now to FIG. 2, a top rear perspective view of a piston-driven lift apparatus 102 between a raised and a lowered position, in accordance with an aspect of the present disclosure, is shown.

FIG. 2 shows the configuration of flexible members 108, 124, and 154 with more clarity. Essentially, lift apparatus 102 comprises several vertically-oriented (vertical) pulleys 202 (labeled as 202a-c in FIG. 2), as well as a plethora of horizontally-oriented (horizontal) pulleys 204 (labeled as 204a-j in FIG. 2).

Regarding flexible member 108, a first end thereof may be securely attached to upper crossbar attachment point 106. Flexible member 108 may then pass through guide 206 of guiding mechanism 118. Guide 206 may be a pin, bolt, spool, or any similar component recognized by those skilled in the relevant art(s) configured between two lips that keep flexible member 108 from laterally sliding away from guide 206. Flexible member 108 may then pass through vertical pulley 202c of guiding mechanism 118, through horizontal pulley 204j of central bracket 132, through horizontal pulley 204f of cylinder bracket 144, through horizontal pulley 204i of pulley system 142, through horizontal pulley 204e of cylinder bracket 144, and into piston barrel 156 (not clearly visible in FIG. 2) via rod end port 152 wherein it is attached to an attachment point on the end of the piston rod. The attachment point may comprise a hook, loop, or any similar structure as recognized by those skilled in the relevant art(s) and may be either formed as part of the piston rod or securely affixed thereto.

In a similar manner to flexible member 108, flexible member 154 may be securely attached to lifting bar attachment point 148b on lifting bar 126b. Flexible member 154 may then pass through vertical pulley 202a of alignment bracket 140, horizontal pulley 204a of tube bracket 136, horizontal pulley 204h of pulley system 142, horizontal pulley 302 (not shown in FIG. 2) of central bracket 132, and may then be attached to pulley system attachment point 208b on the bottom portion of pulley system 142. Pulley system attachment points 208 may comprise hooks, loops, or any similar structure as recognized by those skilled in the relevant art(s) and may either be formed as part of or securely affixed to pulley system 142.

Similarly to flexible members 108 and 154, flexible member 124 may be securely connected to lifting bar attachment point 148a on lifting bar 126a. Flexible member 124 may then pass through vertical pulley 202b of piston bracket 146, horizontal pulley 204d of piston bracket 146, horizontal pulley 204a of central bracket 132, horizontal pulley 204g of pulley system 142, horizontal pulley 204b of central bracket 132, and then securely connected to pulley system attachment point 208a on the upper portion of pulley system 142.

Figure 3:
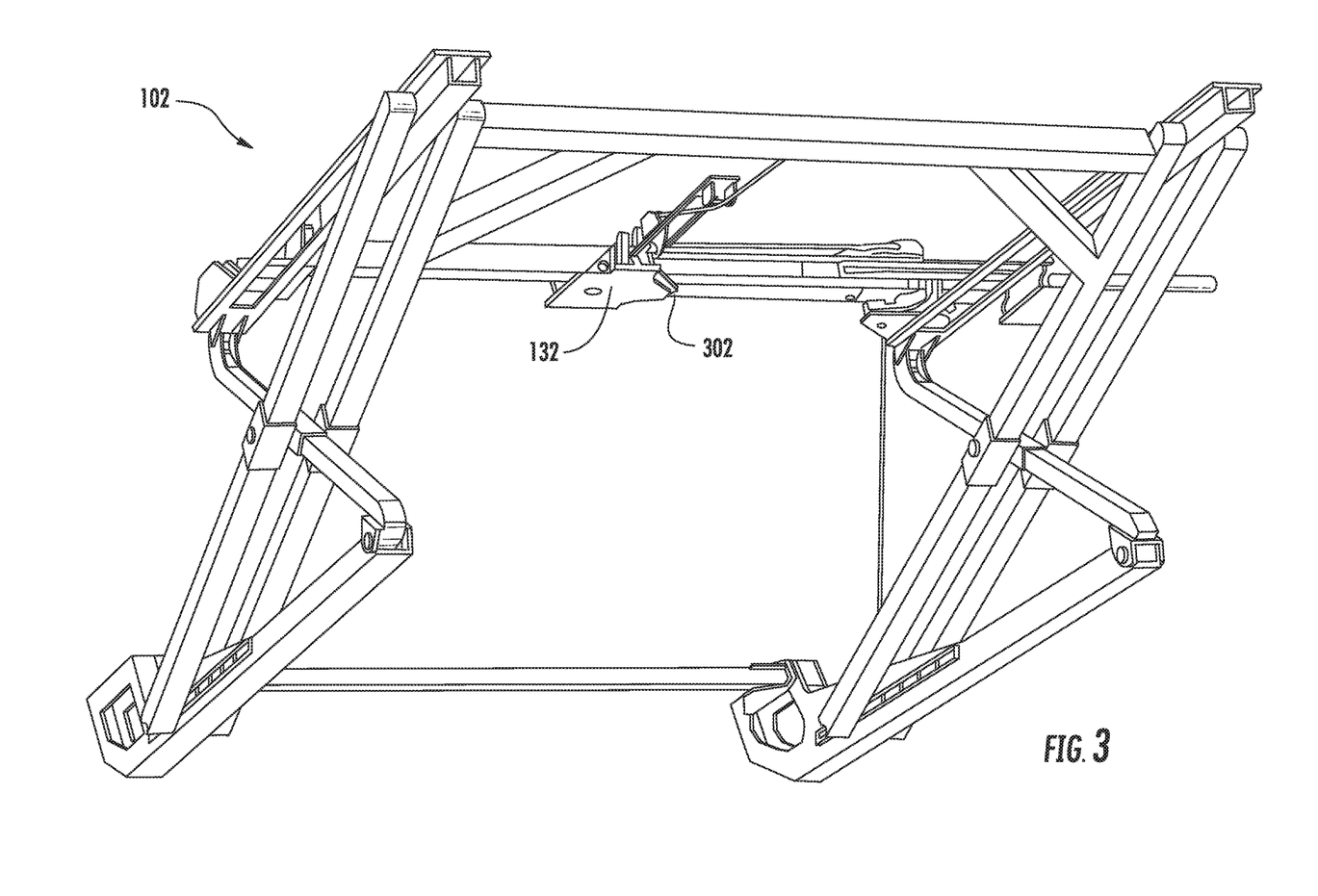
FIG. 3 is a bottom rear perspective view of a piston-driven lift apparatus between a raised and a lowered position, in accordance with an aspect of the present disclosure.

Referring briefly to FIG. 3, a bottom rear perspective view of a piston-driven lift apparatus 102 between a raised and a lowered position, in accordance with an aspect of the present disclosure, is shown.

FIG. 3 is useful in showing horizontal pulley 302, which is located on the lower portion of central bracket 132.

Figure 4:
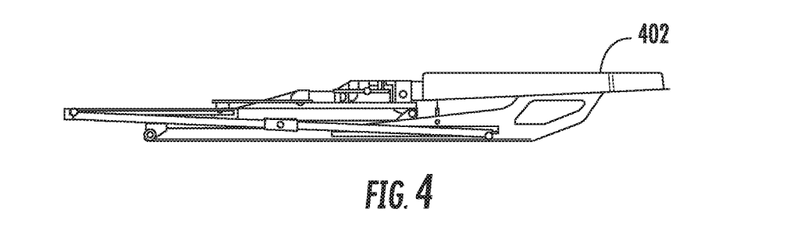
FIG. 4 is a side view of a piston-driven lift apparatus comprising a platform in a raised position, in accordance with an aspect of the present disclosure.
Figure 5:
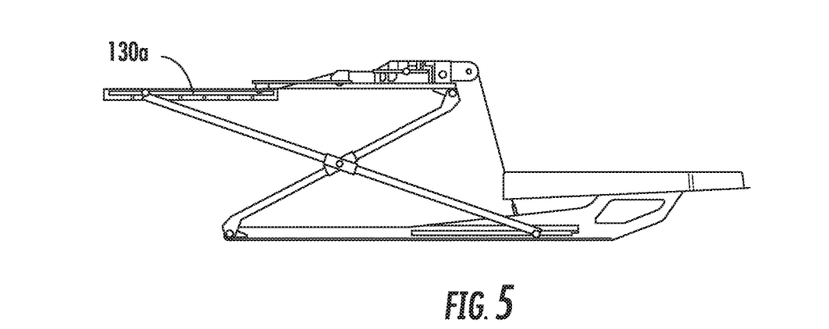
FIG. 5 is a side view of a piston-driven lift apparatus comprising a platform between a raised and a lowered position, in accordance with an aspect of the present disclosure.
Figure 6:
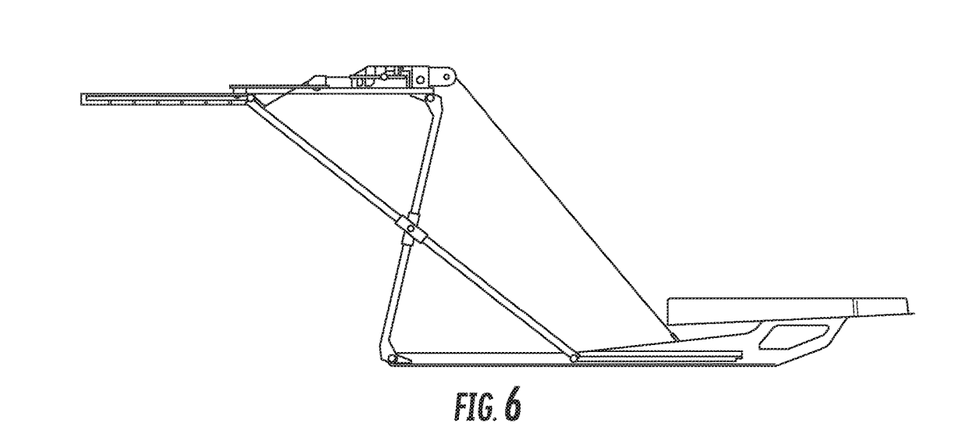
FIG. 6 is a side view of a piston-driven lift apparatus comprising a platform in a lowered position, in accordance with an aspect of the present disclosure.

Referring now to FIGS. 4-6, a side view of a piston-driven lift apparatus 102 comprising a platform 402 in a raised position, between a raised and a lowered position, and a lowered position are shown, respectively, in accordance with an aspect of the present disclosure, are shown.

In an aspect, lift apparatus 102 further comprises platform 402. Platform 402 is a substantially flat, rigid structure constructed of fiberglass, plastic, carbon fiber, Kevlar® para-aramid synthetic fiber, aluminum, steel, titanium, or any other strong, corrosion-resistant materials and the like. Platform 402 may be horizontally-oriented and configured to support cargo such as marine vessels, dry goods, other cargo, and people. Platform 402 permanently or removably attaches to the elongated, upward-facing end portions of one or more lifting bars 126.

FIGS. 4-6 are further used to illustrate the raising and lowering functions of lift apparatus 102, which is described below. The appropriate reference labels of FIGS. 1-3 have been omitted from FIGS. 4-6 for the sake of visual clarity.

The movement of lift apparatus 102 between the raised and lowered positions is facilitated by the functioning of the piston within piston barrel 156. By adjusting the fluid pressure (either liquid or gaseous) applied to the appropriate side(s) of the piston within barrel 156 as will be appreciated by those skilled in the relevant art(s) after reading the description herein, the piston is driven back and forth between opposing ends of barrel 156. A piston rod securely attaches to the piston at one end and to flexible member 108 via an attachment point at the opposing end. This configuration allows the piston to pull in or let out portions of flexible member 108 as it functions, thereby varying the amount of flexible member 108 exposed outside of barrel 156. As the exposed amount of flexible member 108 varies, the position of pulley system 142 is adjusted, as it is attached to flexible member 108 via horizontal pulley 204i and is thus influenced directly by its motion. As pulley system 142 moves, it is contained via the interaction of cylinder 128 within cylinder bracket 144 and tube 134 while contemporaneously effectuating the movement of flexible members 124 and 154, both of which are attached thereto. Flexible members 124 and 154, via their configurations amongst various pulleys integrated with lift apparatus 102 as described above, move in concert with one another such that the amount of flexible member 154 exposed between lifting bar attachment point 148b and vertical pulley 202a remains substantially equal to the amount of flexible member 124 exposed between lifting bar attachment point 148a and vertical pulley 202b, thereby maintaining lifting bars 126a and 126b at essentially the same vertical level, allowing for platform 402 attached thereto to remain in a substantially straight horizontal orientation during the functioning of lift apparatus 102. As the exposed amount of flexible member 108 outside of piston barrel 156 increases, so does the exposed amount of flexible members 124 and 154 between vertical pulleys 202b and 202a, respectively, and lifting bar attachment points 148a and 148b, respectively, increases, gravity pulls lifting bars 126a-b downward. As a result, the end of slide arm 116 that is connected to lifting bars 126 slides from the front end to the rear end of a lateral slot 130 therein via one slide 114 while the end of slide arm 116 connected to support brace 110 slides from the rear end to the front end of a corresponding lateral slot 130 contained therein via a second slide 114. Contemporaneously, link arm 120 moves from a nearly-horizontal position to a nearly vertical position via a pivoting motion at fasteners 122 and thereby pushes lifting bars 126 forward as they move downward until lift apparatus 102 is completely in the lowered position, thereby keeping platform 402 substantially level. To move lift apparatus 102 to the raised position, the exposed amount of flexible member 108 is decreased and the entire process outlined above is reversed.

At particular stages of movement of lift apparatus 102 (especially in the raised and lowered positions), various locking mechanisms may be engaged to keep it in place should one or more of flexible members 108, 124, and 154 break and/or if the piston device should fail during operation. Such locking mechanisms may comprise pins, sockets, clips, springs, or any other similar components and/or combinations thereof as will be appreciated by those skilled in the relevant art(s) after reading the description herein.

FIG. 5 is noted specifically for its ability to show more clearly the lateral slot 130a within support brace 110a.

Figure 7:
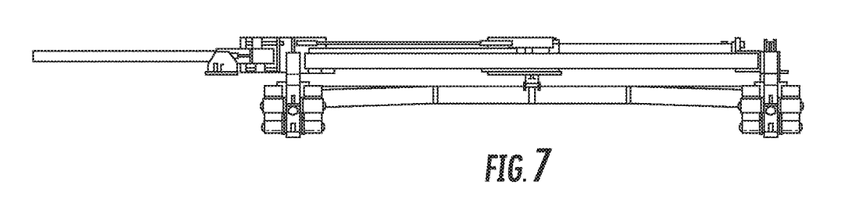
FIG. 7 is a front view of a piston-driven lift apparatus in a raised position, in accordance with an aspect of the present disclosure.
Figure 8:
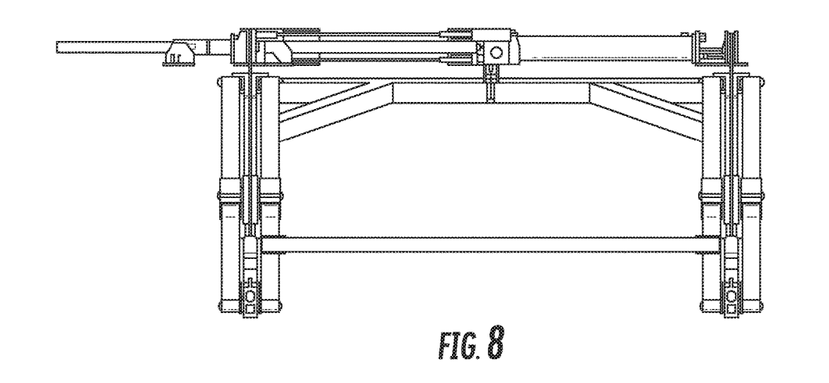
FIG. 8 is a front view of a piston-driven lift apparatus between a raised and a lowered position, in accordance with an aspect of the present disclosure.
Figure 9:
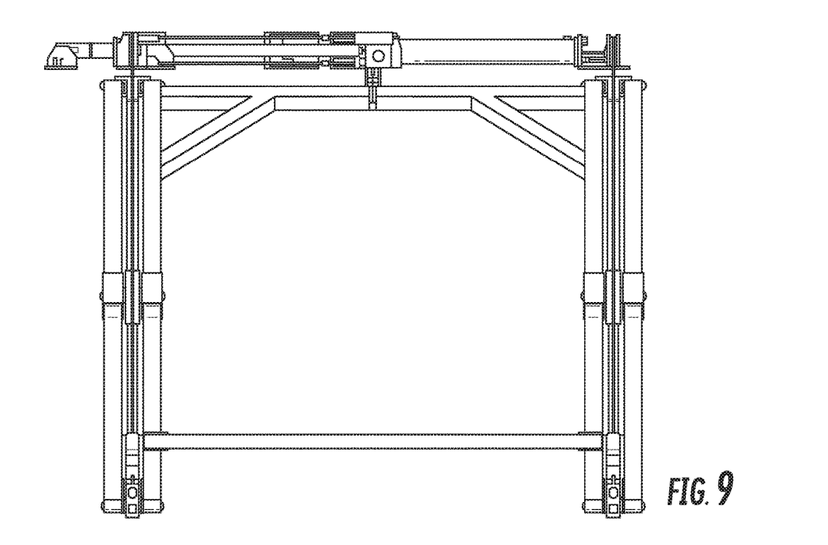
FIG. 9 is a front view of a piston-driven lift apparatus in a lowered position, in accordance with an aspect of the present disclosure.

Referring briefly to FIGS. 7-9, a front view of a piston-driven lift apparatus 102 comprising a platform 402 in a raised position, between a raised and a lowered position, and a lowered position, respectively, in accordance with an aspect of the present disclosure, are shown.

Figure 10:
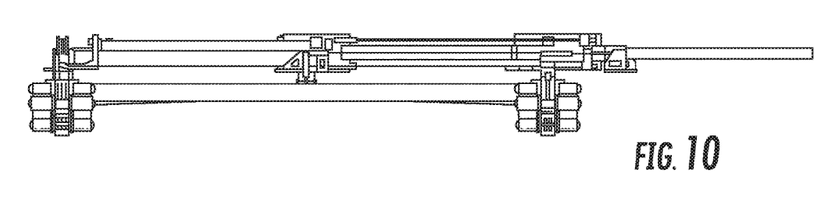
FIG. 10 is a rear view of a piston-driven lift apparatus in a raised position, in accordance with an aspect of the present disclosure.
Figure 11:
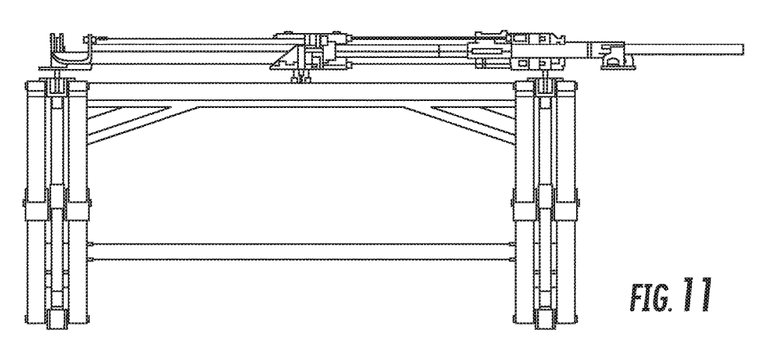
FIG. 11 is a rear view of a piston-driven lift apparatus between a raised and a lowered position, in accordance with an aspect of the present disclosure.
Figure 12:
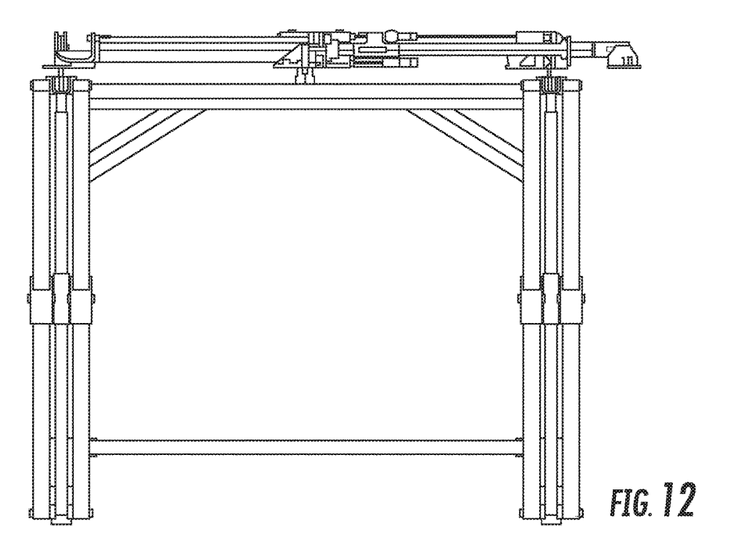
FIG. 12 is a rear view of a piston-driven lift apparatus in a lowered position, in accordance with an aspect of the present disclosure.

Referring briefly to FIGS. 10-12, a rear view of a piston-driven lift apparatus 102 comprising a platform 402 in a raised position, between a raised and a lowered position, and a lowered position, respectively, are shown.

Figure 13:
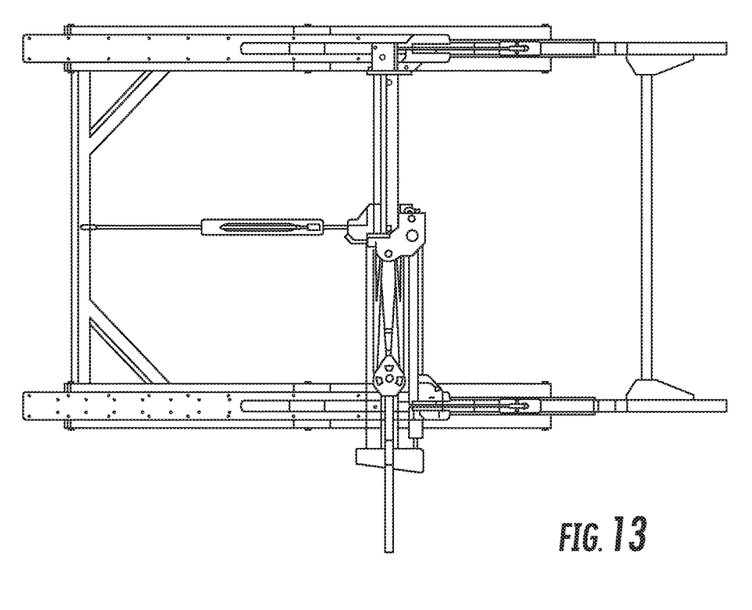
FIG. 13 is a top view of a piston-driven lift apparatus between a raised and a lowered position, in accordance with an aspect of the present disclosure.
Figure 14:
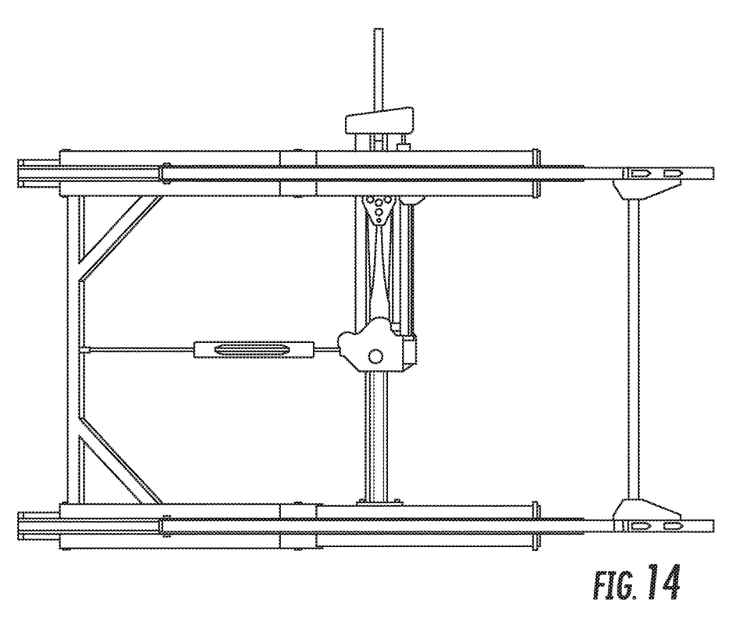
FIG. 14 is a bottom view of a piston-driven lift apparatus between a raised and a lowered position, in accordance with an aspect of the present disclosure.

Referring briefly to FIGS. 13-14, various other views and configurations of piston-driven lift apparatus 102, in accordance with an aspect of the present disclosure, are shown.

Figure 15:
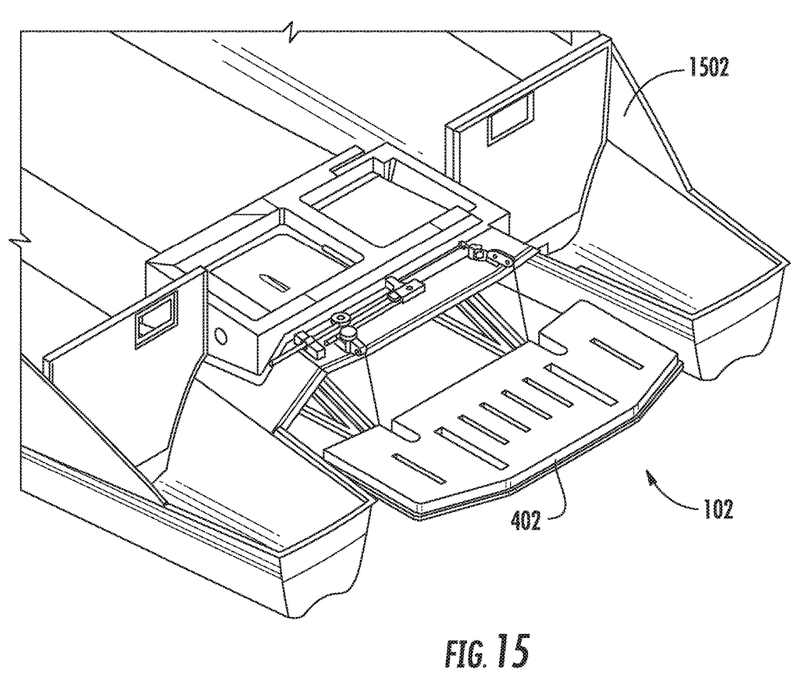
FIG. 15 is a top front perspective view of a piston-driven lift apparatus comprising a platform mounted on a vessel between a raised and a lowered position, in accordance with an aspect of the present disclosure.

Referring briefly to FIG. 15, a top front perspective view of a piston-driven lift apparatus 102 comprising a platform 402 mounted on a vessel 1502 between a raised and a lowered position, in accordance with an aspect of the present disclosure, is shown.

In an aspect, lift apparatus 102 is attached to the rear of vessel 1502 and comprises platform 402. As shown in FIG. 15, vessel 1502 may be a catamaran comprising two hulls separated by a distance and connected by one or more decks.

Figure 16:
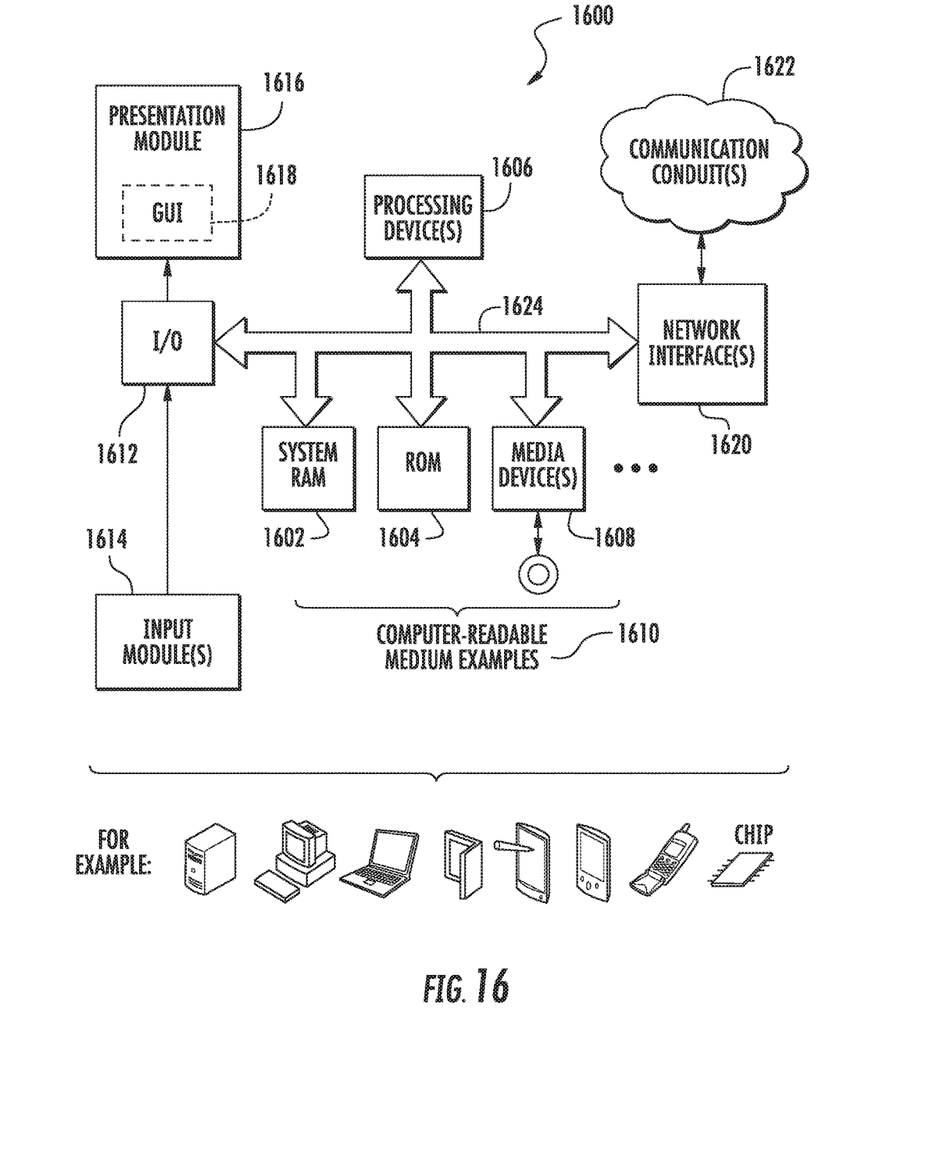
FIG. 16 is a block diagram of an exemplary computing system useful for implementing aspects of the present disclosure.

Referring now to FIG. 16, a block diagram of an exemplary computer system useful for implementing various aspects the processes disclosed herein, in accordance with one or more aspects of the present disclosure, is shown Computing functionality 1600 represents one or more physical and tangible processing mechanisms.

Computing functionality 1600 may comprise volatile and non-volatile memory, such as RAM 1602 and ROM 1604, as well as one or more processing devices 1606 (e.g., one or more central processing units (CPUs), one or more graphical processing units (GPUs), and the like). Computing functionality 1600 also optionally comprises various media devices 1608, such as a hard disk module, an optical disk module, and so forth. Computing functionality 1600 may perform various operations identified above when the processing device(s) 1606 execute(s) instructions that are maintained by memory (e.g., RAM 1602, ROM 1604, and the like).

More generally, instructions and other information may be stored on any computer readable medium 1610, including, but not limited to, static memory storage devices, magnetic storage devices, and optical storage devices. The term "computer readable medium" also encompasses plural storage devices. In all cases, computer readable medium 1610 represents some form of physical and tangible entity. By way of example, and not limitation, computer readable medium 1610 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1602, ROM 1604, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 1600 may also comprise an input/output module 1612 for receiving various inputs (via input modules 1614), and for providing various outputs (via one or more output modules). One particular output module mechanism may be a presentation module 1616 and an associated GUI 1618. Computing functionality 1600 may also include one or more network interfaces 1620 for exchanging data with other devices via one or more communication conduits 1622. In some embodiments, one or more communication buses 1624 communicatively couple the above-described components together.

Communication conduit(s) 1622 may be implemented in any manner (e.g., by a local area network, a wide area network (e.g., the Internet), and the like, or any combination thereof). Communication conduit(s) 1622 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. A multi-hull vessel lift apparatus, comprising:
   (a) a pair of lift assemblies positioned in parallel, each lift assembly comprising:

(i) a horizontal support brace configured to attach to a multi-hull vessel, the support brace having a support brace first end and a second end;

(ii) a horizontal lifting bar generally parallel with the horizontal support brace, the horizontal lifting bar is generally below the support brace, the horizontal lifting bar having a lifting bar first end and second end;

(iii) a slide arm extending between the support brace and the lifting bar, the slide arm having a slide arm first end and second end, the slide arm first end being slidably connected to the support brace first end, and the slide arm second end being slidably connected to the lifting bar second end; and (iv) a link arm extending between the support brace and the lifting bar, the link arm having a link arm first end and second end, the link arm first end being pivotally connected to the lifting arm first end, the link arm second end being pivotally connected to the support brace second end, the link arm and the slide arm being pivotally interconnected at a joint, forming a scissor like structure; and (b) a lifting assembly configured to facilitate raising and lowering of the lift bar.

2. The lift apparatus of claim 1, wherein each support brace is attached to the multi-hull vessel at a portion of one of: a deck; a bridge deck; a crossbeam; and a chassis.

3. The lift apparatus of claim 2, wherein the multi-hull vessel is one of: a catamaran; and a trimaran.

4. The lift apparatus of claim 1, wherein the lift apparatus is mounted generally parallel to the centerline of the multi-hull vessel.

5. The lift apparatus of claim 1, wherein:
each of the support brace comprises a first lateral slot for receiving a first slide on the first end of the respective slide arm; and
each of the lifting bar comprises a second lateral slot for receiving a second slide on the second end of the respective slide arm.

6. The lift apparatus of claim 1, further comprising an upper crossbar connected between first ends of the respective slide arms of the pair of lift assemblies.

7. The lift apparatus of claim 1, further comprising a lower crossbar connected between second ends of the respective lifting arms of the pair of lift assemblies.

8. The lift apparatus of claim 1, wherein the position of the support brace in a lowered position is behind the position of the support brace in a raised position.

9. The vessel lift apparatus of claim 8, further comprising:
(c) a platform connected to each lifting bar, wherein the platform is substantially level when the lift apparatus is in the raised position, the lowered position and therebetween.

10. The lift apparatus of claim 9, the platform further comprising at least one marine vessel tie down.

11. The lift apparatus of claim 9, wherein, in the raised position, the platform is level with a vessel deck.

12. The lift apparatus of claim 6, wherein the lifting assembly comprises:
a piston barrel connected between the support braces of the pair of lift assemblies;
a piston rod coaxially disposed within the piston barrel and extending outward from the piston barrel via hydraulic actuation; and
a cable assembly operably connected between the upper crossbar, the piston rod, and the lifting bars.

13. The lift apparatus of claim 12, wherein the cable assembly comprises one of: a wire, a rope, and a cord.

14. The lift apparatus of claim 12, the cable assembly comprising:
(i) an upper crossmember cable connected for movement to the upper crossmember,
(ii) a first lift assembly cable attached to the first lifting bar at a first lifting bar attachment point; and
(iii) a second lift assembly cable attached to the second lifting bar at a second lifting bar attachment point.

15. The lift apparatus of claim 12, wherein the lifting assembly further comprises:
(d) a pulley system connected to the piston rod, the pulley system is configured to guide the cable assembly.

16. The lift apparatus of claim 15, the pulley system facilitates movement to the piston rod.

17. A multi-hull vessel lift apparatus, comprising:
(a) a lift assembly attached to a multi-hull vessel cross-deck, the lift assembly comprising:
(i) a horizontal support brace configured to attach to a multi-hull vessel, the support brace having a first end and a second end;
(ii) a horizontal lifting bar generally parallel with the horizontal support brace, the horizontal lifting bar is generally below the support brace, the horizontal lifting bar having a lifting bar first end and second end;
(iii) a slide arm extending between the support brace and the lifting bar, the slide arm having a slide arm first end and second end, the slide arm first end being slidably connected to the support brace first end, and the slide arm second end being slidably connected to the lifting bar second end; and
(iv) a link arm extending between the support brace and the lifting bar, the link arm having a link arm first end and second end, the link arm first end being pivotally connected to the lifting arm first end, the link arm second end being pivotally connected to the support brace second end, the link arm and the slide arm being pivotally interconnected at a joint, forming a scissor like structure; and
(b) a lifting assembly configured to facilitate raising and lowering of the lifting bar; and
(c) a platform connected to each lifting bar, wherein the platform is substantially level when the lift apparatus is in the raised position, the lowered position and therebetween.

* * * * *